US011598400B2

(12) United States Patent
Schroeder et al.

(10) Patent No.: US 11,598,400 B2
(45) Date of Patent: Mar. 7, 2023

(54) NUT WITH FLEXIBLE FINGERS AND SELF-ALIGNING MEMBERS (71) Applicants: Robert Schroeder, Fernandina Beach, FL (US); Kent Proffitt, Belvidere, IL (US); Kollin Proffitt, Belvidere, IL (US); Keith Cummings, Rockford, IL (US); Caleb Thibodeaux, Lake Charles, LA (US)

(72) Inventors: Robert Schroeder, Fernandina Beach, FL (US); Kent Proffitt, Belvidere, IL (US); Kollin Proffitt, Belvidere, IL (US); Keith Cummings, Rockford, IL (US); Caleb Thibodeaux, Lake Charles, LA (US)

(73) Assignee: Pacific Bearing Corporation, Rockford, IL (US)

( * ) Notice: Subject to any disclaimer, the term of this patent is extended or adjusted under 35 U.S.C. 154(b) by 0 days.

(21) Appl. No.: 17/517,171

(22) Filed: Nov. 2, 2021

(65) Prior Publication Data
US 2022/0154807 A1 May 19, 2022

Related U.S. Application Data (60) Provisional application No. 63/115,885, filed on Nov. 19, 2020.

(51) Int. Cl.
F16H 25/24 (2006.01)
(52) U.S. Cl.
CPC .................................. F16H 25/24 (2013.01)

(58) Field of Classification Search
CPC .. F16H 25/2009; F16H 25/2006; F16H 25/24; F16H 25/2209; F16H 25/08; F16H 2025/2075; F16H 2025/2436; F16H 2025/2445; F16H 25/2003; F16H 25/2025
See application file for complete search history.

(56) References Cited

U.S. PATENT DOCUMENTS

| 2,228,244 | A | 1/1941 | Baker |
| 2,348,611 | A | 5/1944 | Davidson |
| 2,610,519 | A | 9/1952 | Rokos |
| 3,023,631 | A | 3/1962 | Curtis |
| 3,359,792 | A | 12/1967 | Lukens |
| 3,640,138 | A | 2/1972 | Hahn et al. |
| 3,656,358 | A | 4/1972 | Kopp |

(Continued)

FOREIGN PATENT DOCUMENTS

| GB | 2408301 A | 5/2005 |
| JP | 61228157 A | 10/1986 |

(Continued)

OTHER PUBLICATIONS

Haydon Kerk News; Splinerail Linear Actuator with an Integral Connector Option http://www.haydonkerk.com/News/tabid/231/novusact/viewarticle/Default.aspx?articleid=RGMUPZ00Xgo; known to applicant on or before Jan. 13, 2012; 1 page.

Primary Examiner — Zakaria Elahmadi
(74) Attorney, Agent, or Firm — Reinhart Boerner Van Deuren P.C.

(57) ABSTRACT

A nut assembly for use with lead screws is provided. The nut assembly includes a nut member and an adjustment arrangement that can independently adjust the biasing of flexible fingers of the nut member.

22 Claims, 9 Drawing Sheets

(56) References Cited

U.S. PATENT DOCUMENTS

| | | | | |
|---|---|---|---|---|
| 3,713,932 | A | 1/1973 | Butzow et al. | |
| 3,977,262 | A * | 8/1976 | Randolph | B41J 19/20 74/89.32 |
| 3,977,269 | A | 8/1976 | Linley, Jr. | |
| 4,131,031 | A | 12/1978 | Erikson et al. | |
| 4,210,033 | A | 7/1980 | Erikson et al. | |
| 4,249,426 | A | 2/1981 | Erikson et al. | |
| 4,249,429 | A | 2/1981 | Erikson et al. | |
| 4,274,294 | A | 6/1981 | Siryj et al. | |
| 4,282,764 | A | 8/1981 | Harris | |
| 4,434,677 | A | 3/1984 | Linley, Jr. | |
| 4,593,572 | A * | 6/1986 | Linley, Jr. | F16H 25/2009 74/467 |
| RE32,433 | E | 6/1987 | Erikson et al. | |
| 4,802,374 | A | 2/1989 | Hamelin et al. | |
| 4,953,418 | A | 9/1990 | Hirose | |
| 4,954,032 | A * | 9/1990 | Morales | F16H 25/2006 411/289 |
| 5,027,671 | A * | 7/1991 | Erikson | F16H 25/2009 74/424.78 |
| 5,097,716 | A | 3/1992 | Barbat et al. | |
| 5,107,716 | A | 4/1992 | Torii et al. | |
| 5,146,802 | A | 9/1992 | Yanagisawa | |
| 5,195,391 | A | 3/1993 | Barbat et al. | |
| 5,303,606 | A | 4/1994 | Kokinda | |
| 5,329,825 | A | 7/1994 | Askins | |
| 5,456,134 | A | 10/1995 | Bouwer et al. | |
| 5,601,372 | A | 2/1997 | Erikson et al. | |
| 5,676,016 | A | 10/1997 | Nagai et al. | |
| 5,720,202 | A | 2/1998 | Senjo et al. | |
| 5,732,592 | A | 3/1998 | Parker | |
| 5,732,596 | A | 3/1998 | Erikson et al. | |
| 5,769,377 | A | 6/1998 | Gauger | |
| 5,839,321 | A | 11/1998 | Siemens | |
| 5,913,940 | A * | 6/1999 | Erikson | F16H 25/2009 411/270 |
| 5,913,941 | A | 6/1999 | Erikson et al. | |
| 5,937,702 | A | 8/1999 | Erikson et al. | |
| 6,041,671 | A | 3/2000 | Erikson et al. | |
| 6,053,062 | A | 4/2000 | Ishikawa et al. | |
| 6,099,166 | A | 9/2000 | Erikson et al. | |
| 6,117,249 | A | 9/2000 | Erikson et al. | |
| 6,131,478 | A | 10/2000 | Erikson et al. | |
| 6,148,714 | A | 11/2000 | Abe et al. | |
| 6,202,500 | B1 | 3/2001 | Erikson et al. | |
| 6,240,798 | B1 * | 6/2001 | Erikson | F16H 25/2009 74/424.81 |
| 6,267,021 | B1 | 7/2001 | Mauro | |
| 6,415,673 | B1 | 7/2002 | Erikson et al. | |
| 6,422,101 | B2 | 7/2002 | Erikson et al. | |
| 6,467,362 | B2 | 10/2002 | Erikson et al. | |
| 6,581,508 | B2 | 6/2003 | Kudo et al. | |
| 6,662,672 | B2 | 12/2003 | Someya | |
| 6,880,417 | B2 | 4/2005 | Nagai et al. | |
| 7,219,570 | B2 | 5/2007 | Erikson et al. | |
| 7,481,126 | B2 | 1/2009 | Las Navas Garcia | |
| 7,506,557 | B2 | 3/2009 | Hosokai et al. | |
| 7,522,657 | B2 | 6/2009 | Erikson et al. | |
| 7,794,150 | B2 | 9/2010 | Keller et al. | |
| 7,878,082 | B2 | 2/2011 | Yamagishi | |
| 7,891,265 | B2 | 2/2011 | Erikson et al. | |
| 7,992,456 | B2 | 8/2011 | Schroeder et al. | |
| 8,028,594 | B2 | 10/2011 | Schroeder | |
| 8,042,416 | B2 | 10/2011 | Pfister | |
| 8,579,343 | B2 | 11/2013 | Park et al. | |
| 9,010,205 | B2 | 4/2015 | Schroeder et al. | |
| 9,245,697 | B2 | 1/2016 | Houbre et al. | |
| 9,618,104 | B2 * | 4/2017 | Kahnert | F16H 25/2209 |
| 2004/0093971 | A1 | 5/2004 | Fujibayashi | |
| 2005/0199451 | A1 | 11/2005 | Yamagishi | |
| 2005/0257633 | A1 | 11/2005 | Yamagishi | |
| 2006/0207359 | A1 | 9/2006 | Kowalski | |
| 2007/0295128 | A1 * | 12/2007 | Erikson | F16H 25/24 74/89.42 |
| 2008/0119294 | A1 | 5/2008 | Erikson et al. | |
| 2008/0190225 | A1 | 8/2008 | Pfister | |
| 2009/0126521 | A1 * | 5/2009 | Schroeder | F16B 37/0864 411/433 |
| 2009/0145252 | A1 * | 6/2009 | Schroeder | F16H 25/2006 74/89.42 |
| 2009/0249910 | A1 | 10/2009 | Erikson et al. | |
| 2009/0314111 | A1 | 12/2009 | Schunke | |
| 2011/0247904 | A1 | 10/2011 | Yamasaki | |
| 2013/0133448 | A1 | 5/2013 | Schroeder et al. | |
| 2015/0300466 | A1 * | 10/2015 | Kahnert | F16H 25/2209 74/441 |
| 2015/0376929 | A1 * | 12/2015 | Scheuring | F16D 43/21 74/89.38 |
| 2020/0114804 | A1 * | 4/2020 | Fladhammer | F21S 41/675 |
| 2021/0408739 | A1 * | 12/2021 | Ivancic | H01R 13/622 |

FOREIGN PATENT DOCUMENTS

| JP | 2001221313 A | 8/2001 | | |
|---|---|---|---|---|
| JP | 2001280440 A | 10/2001 | | |
| JP | 2003240098 A | 8/2003 | | |
| WO | WO-8000270 A1 * | 7/1979 | | |
| WO | WO-9729303 A1 * | 8/1997 | ......... | F16H 25/2009 |
| WO | WO 2006106817 A1 | 10/2006 | | |
| WO | WO 2020/210517 A1 | 10/2020 | | |

* cited by examiner

NUT WITH FLEXIBLE FINGERS AND SELF-ALIGNING MEMBERS

CROSS-REFERENCE TO RELATED PATENT APPLICATIONS

This patent application claims the benefit of U.S. Provisional Patent Application No. 63/115,885, filed Nov. 19, 2020, the entire teachings and disclosure of which are incorporated herein by reference thereto.

FIELD OF THE INVENTION

This invention generally relates to a lead screw nuts.

BACKGROUND OF THE INVENTION

Lead screw nuts often include flexible fingers that are biased inwards towards a lead screw. This allows for adjustment of the friction between the lead screw and the nut as well as can allow for adjustment of the engagement between the nut and the lead screw due to wear between the two components.

Prior lead screws typically use a biasing mechanism in the form of a band that extended around the flexible fingers to provide the radially directed biasing force to the flexible fingers. One example was a band that had a conical inner periphery that cooperated with a similar conical shape provided by the outer periphery of the fingers. A spring would bias the outer band into the inner conical shape of the fingers to provide the radially directed biasing of the flexible fingers.

Other designs have had O-rings or other bands that had a smaller inner diameter than the outer diameter defined by the outer periphery of the flexible fingers such that the bands or o-rings would radially bias the flexible fingers inward.

While convenient and relatively simple designs, unfortunately, these designs prevented fine tuning of the biasing of each individual finger. Instead, these designs caused any adjustment in the loading provided by the outer band to be averaged between all of the flexible fingers rather than being able to focus adjustment on any particular finger.

Examples described herein provide improvements over the current state of the art.

BRIEF SUMMARY OF THE INVENTION

Examples provide new and improved nut assemblies for engaging lead screws.

An example includes a nut assembly for engaging external threads a lead screw that includes a nut member and an adjustment arrangement. The nut member includes an annular base portion, at least a first and a second flexible finger, and threading. The first flexible finger and the second flexible finger are joined to the base portion. Each of the first flexible finger and the second flexible finger extends axially from the base portion. Each of the first flexible finger and the second flexible finger extends between a first end joined to the base portion and a second free end. This is a generally cantilevered orientation. Further, the flexible fingers typically extend in generally parallel orientation (e.g. typically plus or minus 15 degrees). The threading is on an inner periphery of the first and second flexible fingers for engaging with the external threads of a lead screw. The adjustment arrangement includes a cap member and first and second adjustment members. The cap member extends around the first and second flexible fingers. The first adjustment member movably mounts to the cap member to move radially relative to the central axis. The first adjustment member provides adjustable biasing to the first flexible finger radially towards the central axis. The second adjustment member movably mounts to the cap member to move radially relative to the central axis. The second adjustment member provides adjustable biasing to the second flexible finger radially towards the central axis. The radial positioning of the second adjustment member being independently adjustable from the radial positioning of the first adjustment member.

As such, adjustment of the biasing of the first adjustment member is independent of adjustment of the second adjustment member.

In one example, the first adjustment member includes a first screw threadedly mounted to the cap member. The first screw is radially movable relative to the central axis by threading the first screw relative to the cap member to adjust the biasing of the first adjustment member on the first flexible finger. The second adjustment member includes a second screw threadedly mounted to the cap member. The second screw being radially movable relative to the central axis by threading the second screw relative to the cap member to adjust the biasing of the second adjustment member on the second flexible finger. The adjustment of the positioning of the first screw relative to the cap member is independent of the adjustment of the positioning of the second screw relative to the cap member.

In one example, the first adjustment member includes a first spring position radially between the first screw and the first flexible finger. The second adjustment member includes a second spring positioned radially between the second screw and the second flexible finger.

In one example, a nut adaptor having threading that engages threading of the cap member to threadedly attach the cap member to the nut adaptor. The nut adaptor has a first abutment portion axially abutting a third abutment portion of the base portion. The cap member includes a second abutment portion axially abutting a fourth abutment portion of the nut member. The nut member is axially located between the first and second abutment portions.

The first and second abutment portions may be curved about a same spherical center point.

In one example, the first abutment portion has a curved profile and the third abutment portion of the base portion has a curved profile that engages the curved profile of the first abutment portion. The second abutment portion has a curved profile and the fourth abutment portion has a curved profile that engages the curved profile of the second abutment portion.

In one example, the second and fourth abutment portions have a same center of curvature such that the second and fourth abutment portions form part of a common theoretical sphere.

In one example, the third abutment portion is slidable relative to the first abutment portion and the fourth abutment portion is slidable relative to the second abutment portion such that the nut member is pivotable within the cap member.

In one example, the fourth abutment portion is provided by the base portion.

In one example, the first flexible finger has a receiving cavity receiving a first end of the first spring therein. The first screw has a first projection. The first spring has a second end receiving the first projection therein. The second flexible finger has a receiving cavity receiving a first end of the second spring therein. The second screw has a second projection. The second spring has a second end receiving the second projection therein.

In one example, an outer periphery of the cap member has a plurality of flats such that the cap member is engageable by a wrench.

In one example, the first and second adjust members extend through the flats.

In one example, adjustment of the biasing provided by first adjustment member is independent of the adjustment of the biasing provided by the second adjustment member.

In one example, the first abutment portion, second abutment portion, third abutment portion and fourth abutment portion are all planar.

In one example, the first adjust member does not extend entirely around the central axis and the second adjust member does not extend entirely around the central axis. In a specific example, the first and second adjust members extend less than 90 degrees around the central axis.

In one example, the first adjustment member applies biasing to the first flexible finger at a first distance from the base portion and the second adjustment member applies biasing to the second flexible finger at the first distance from the base portion.

In one example, the first adjustment member applies biasing to the first finger at a same axial location along the central axis as the second adjustment member applies biasing to the second finger.

In one example, a major diameter of the threading of the nut has a first section and a second section. The first section decreases in value when moving a first direction along the central axis. The first direction is towards the second section. The second section increases in value when moving in the first direction along the central axis.

In one example, the threading extends axially within the base portion of the nut member. The first section is aligned with the first and second flexible fingers and at least part of the second section being aligned with the base portion of the nut member.

In one example, a first taper axis of the first section of the major diameter has an angle of no more than 1 degree relative to the central axis and a second taper axis of the second section of the major diameter has an angle of no more than 1 degree relative to the central axis.

In an example, a method of adjusting a nut assembly as outlined above includes adjusting a radial position of the first adjustment member without adjusting a radial position of the second adjust member.

In an example, a nut assembly for engaging external threads a lead screw including a nut member, a cap member and a nut adaptor is provided. The nut member includes an annular base portion, first and second flexible fingers, and threading. The an annular base portion has an outer peripheral surface that forms part of a theoretical sphere having a spherical center point. The first flexible finger and a second flexible finger are joined to the base portion. Each of the first flexible finger and the second flexible finger extends axially from the base portion. Each of the first flexible finger and the second flexible finger extends between a first end joined to the base portion and a second free end. The threading is on an inner periphery of the first and second flexible fingers and is for engaging with the external threads of a lead screw. The cap member extends around the first and second flexible fingers and axially abuts a portion of the annular base portion. The nut adaptor attaches to the cap member and axially abuts a portion of the annular base portion with the annular base portion being axially fixed between the cap member and the nut adaptor. The annular base portion is pivotable about the spherical center point within cap member and while engaged by the cap member and the nut adaptor.

In one example, a portion of the cap member that abuts the annular base portion has a curved surface and a portion of the nut adaptor that abuts the annular base portion has a curved surface.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
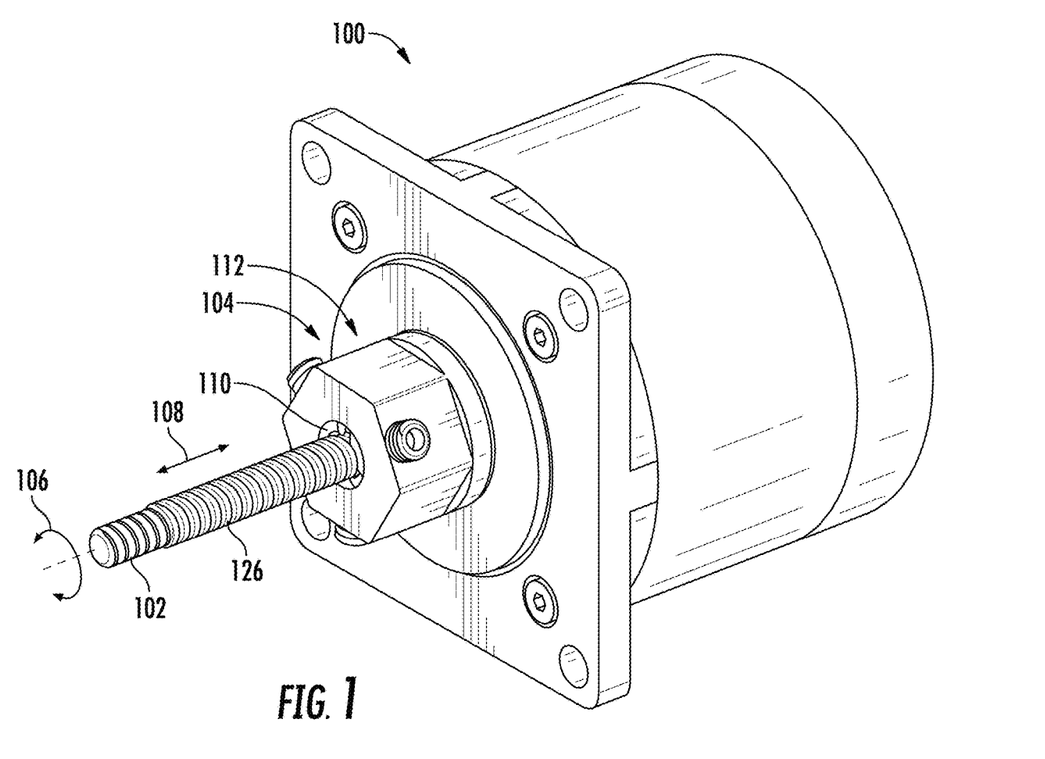
FIG. 1 is a perspective view of a linear actuator including a nut assembly according to the application.
Figure 2:
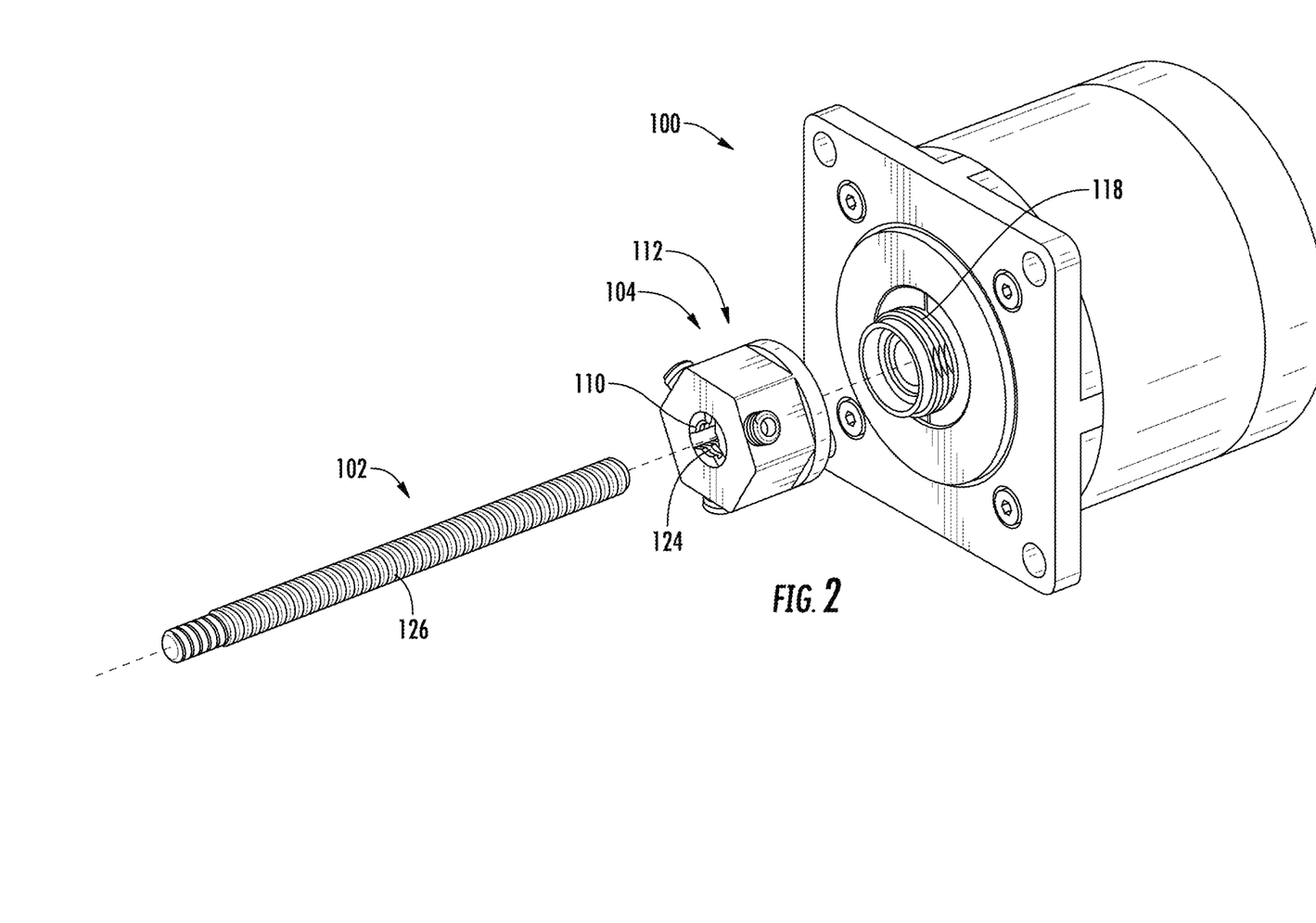
FIG. 2 is an exploded illustration of the linear actuator of FIG. 1.

FIG. 1 illustrates a linear actuator in the form of a motor 100 attached to a lead screw 102 by a nut assembly 104. The nut assembly 104 transfers rotary motion of the motor 100 (arrow 106) into linear motion of the lead screw 102 (arrow 108). FIG. 2 is an exploded illustration of the linear actuator of FIG. 1

Figure 3:
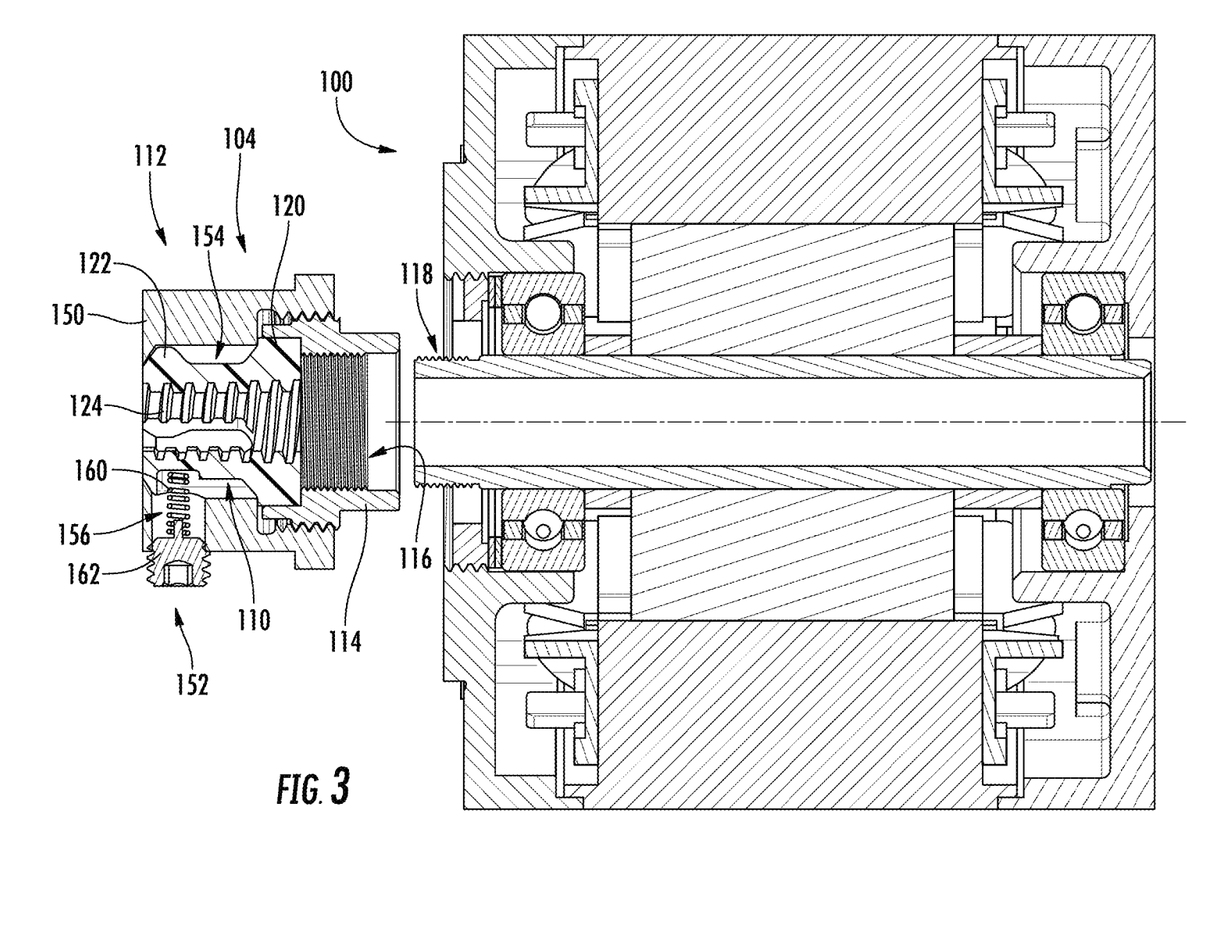
FIG. 3 is a partial exploded and cross-sectional illustration of the motor and nut assembly of the linear actuator of FIG. 1.

FIG. 3 is a cross-sectional illustration of the motor 100 and nut assembly 104, with the nut assembly 104 disconnected from the motor 100.

Figure 4:
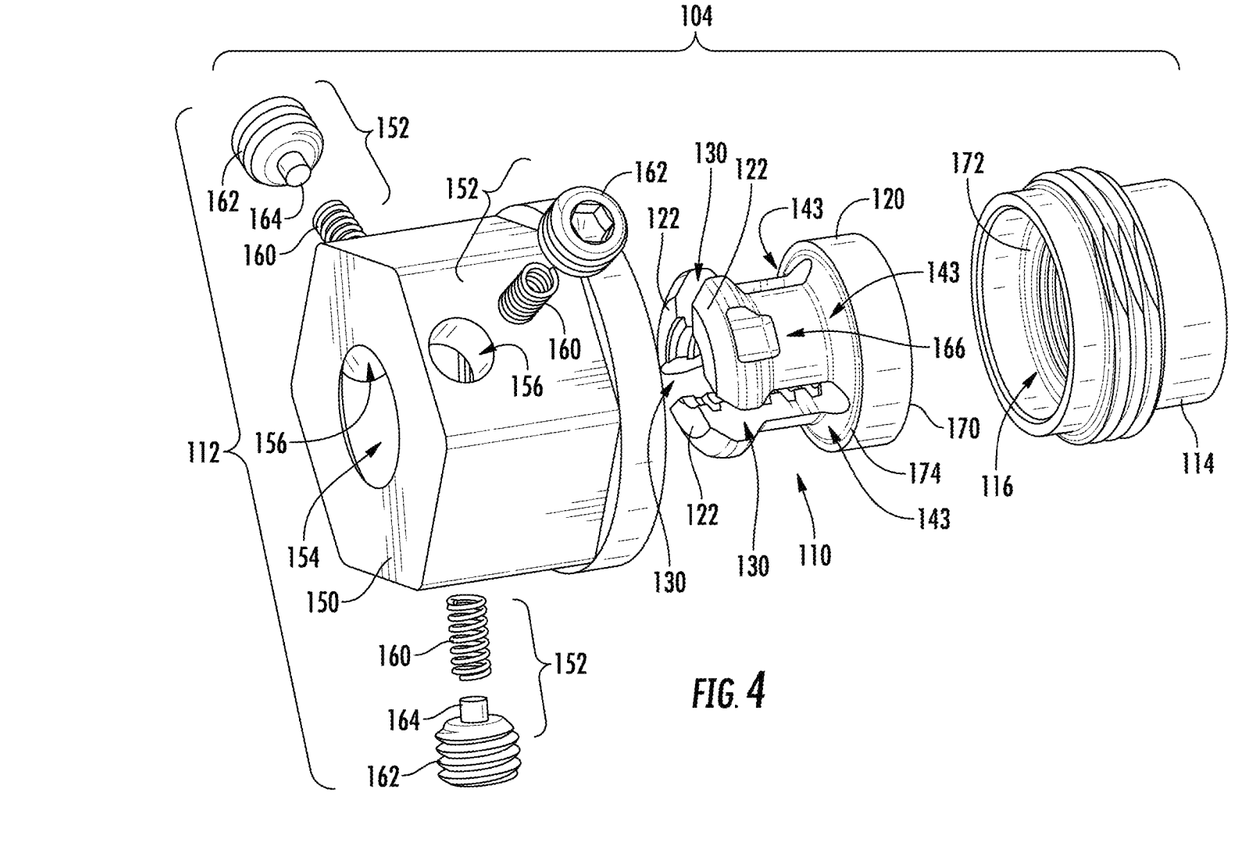
FIG. 4 is an exploded illustration of the nut assembly of FIG. 1.
Figure 5:
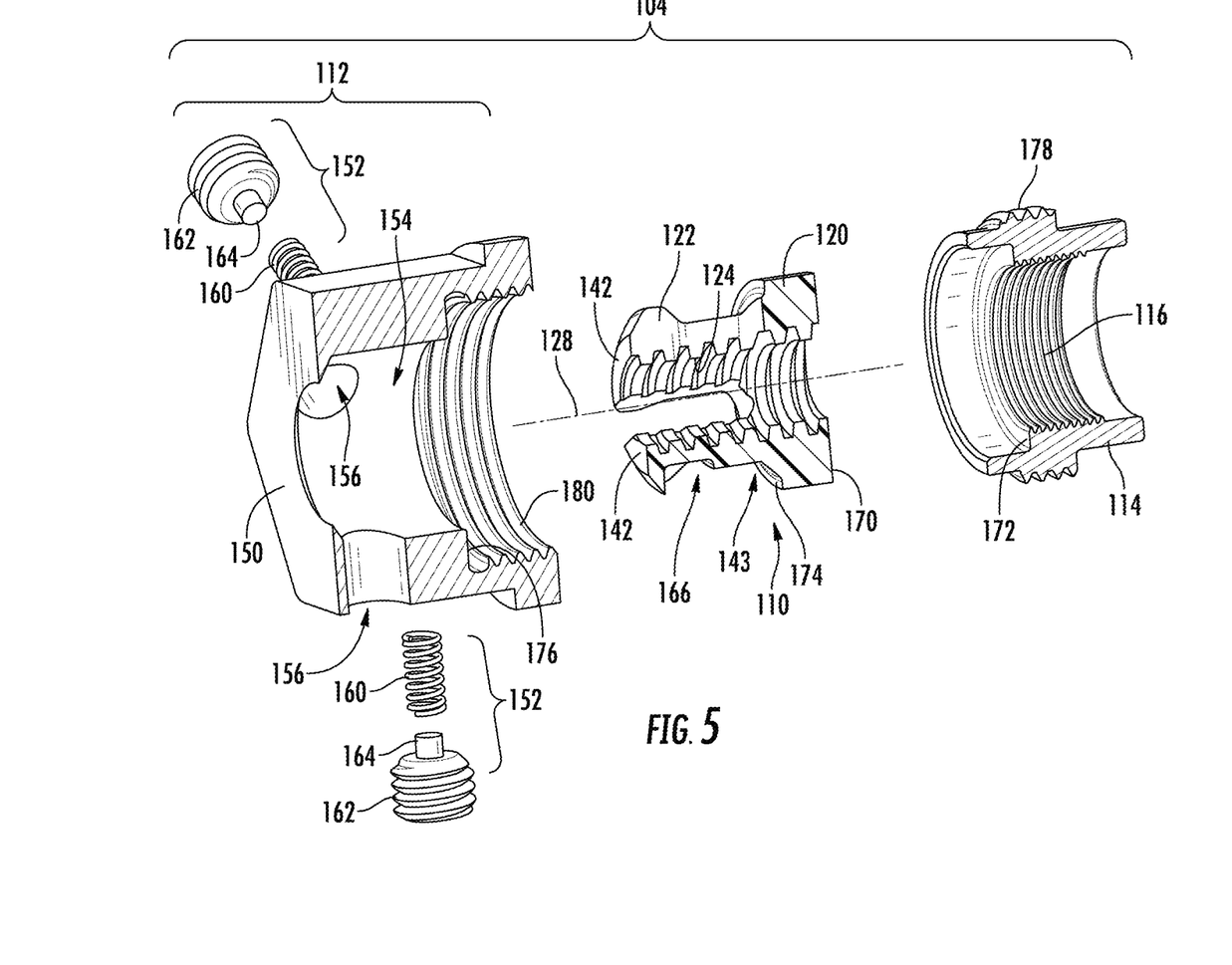
FIG. 5 is a cross-sectional illustration of the nut assembly of FIG. 4 in exploded form.

FIGS. 4 and 5 are exploded illustrations of the nut assembly 104. The nut assembly 104 generally includes a nut member 110 and an adjustment arrangement 112. A nut adaptor 114 may be used to secure the nut member 110 and the adjustment arrangement 112 to one another as well as to secure the nut assembly 104 to motor 100.

The nut adaptor 114 includes threading 116 to attach to corresponding threading 118 of the motor 100 (see FIGS. 2 and 3 for threading 118).

The nut member 110 includes an annular base portion 120 and a plurality of flexible fingers 122 extending axially from the annular base portion 120 between a first end 142 that is a free end and a second end 143 where the flexible fingers 122 are attached to the base portion 120.

Figure 6:
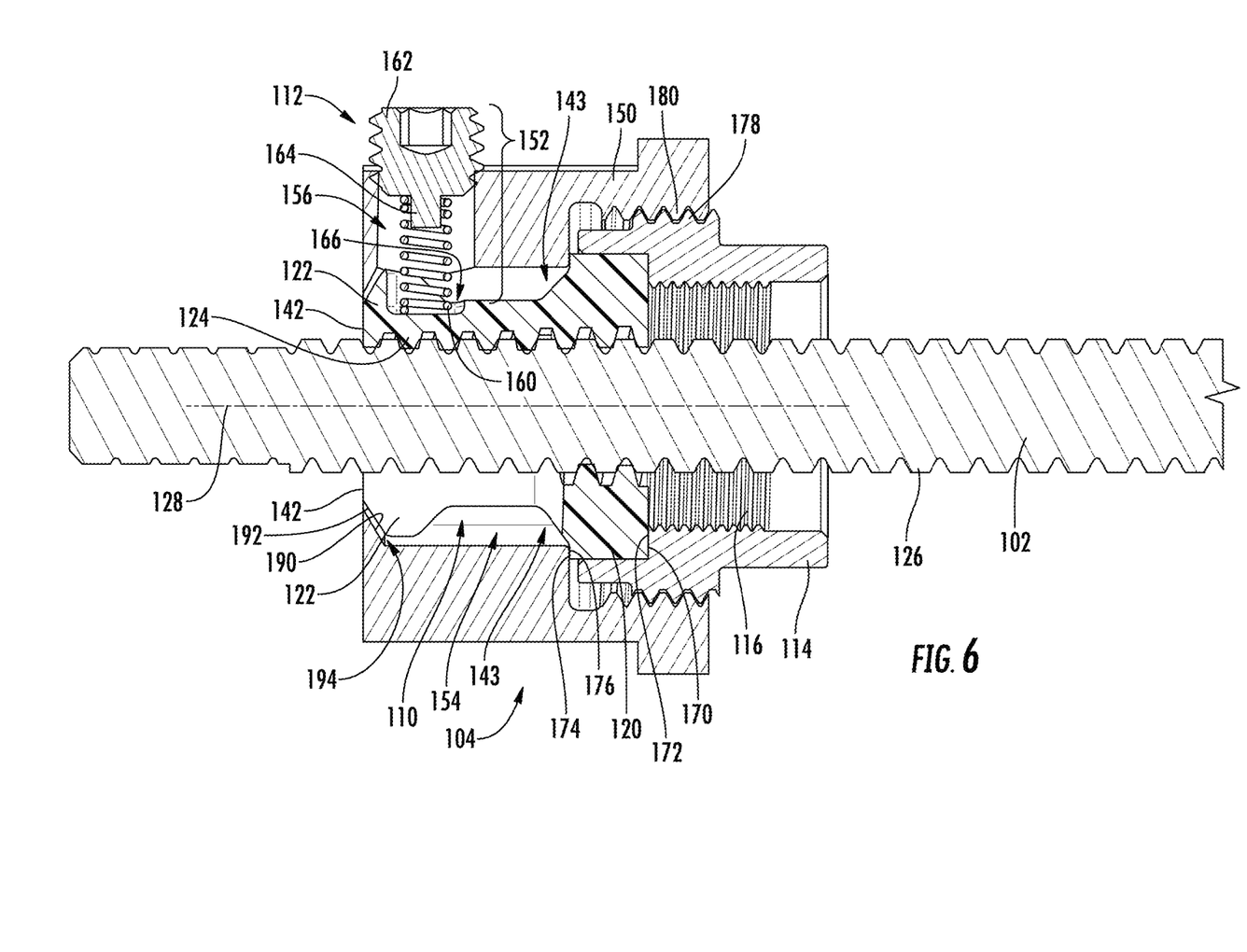
FIG. 6 is a cross-sectional illustration of the nut assembly of FIG. 4 attached to a lead screw.

The nut member 110 includes threading 124 that cooperates with threading 126 of lead screw 102 (see e.g. FIG. 6).

Figure 7:
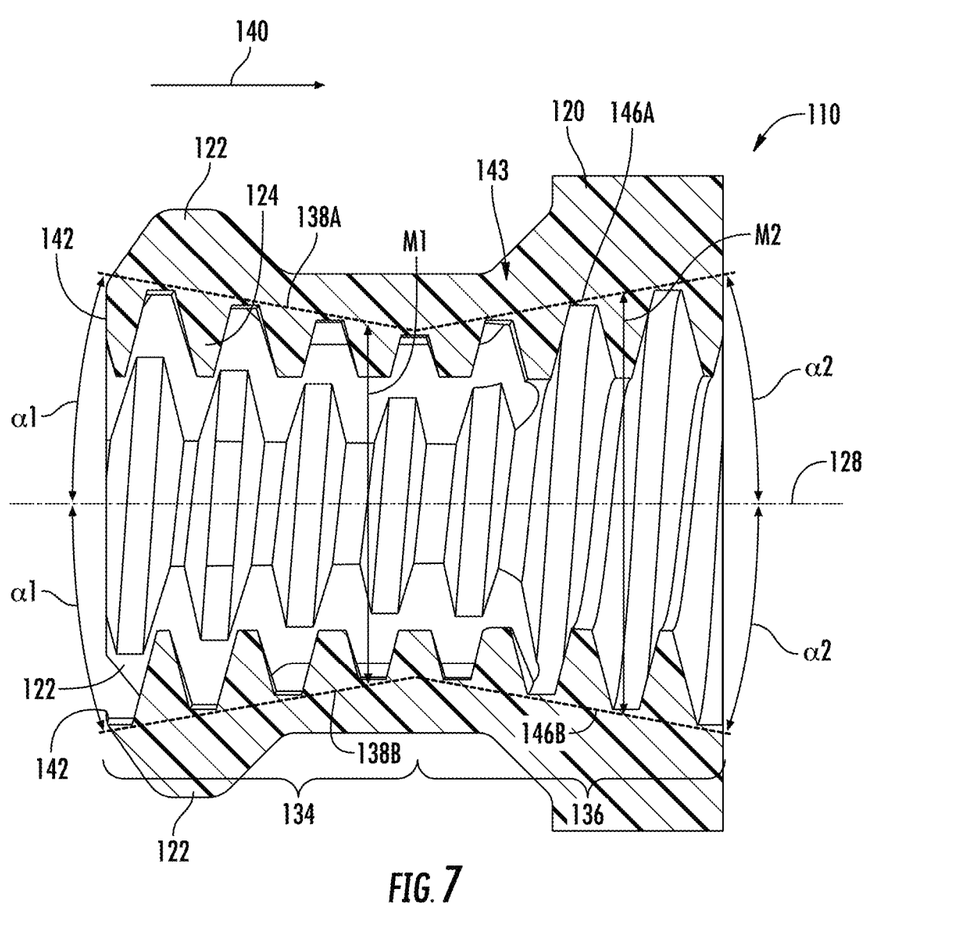
FIG. 7 is a cross-sectional illustration of the nut member of the nut assembly of FIG. 4.
Figure 8:
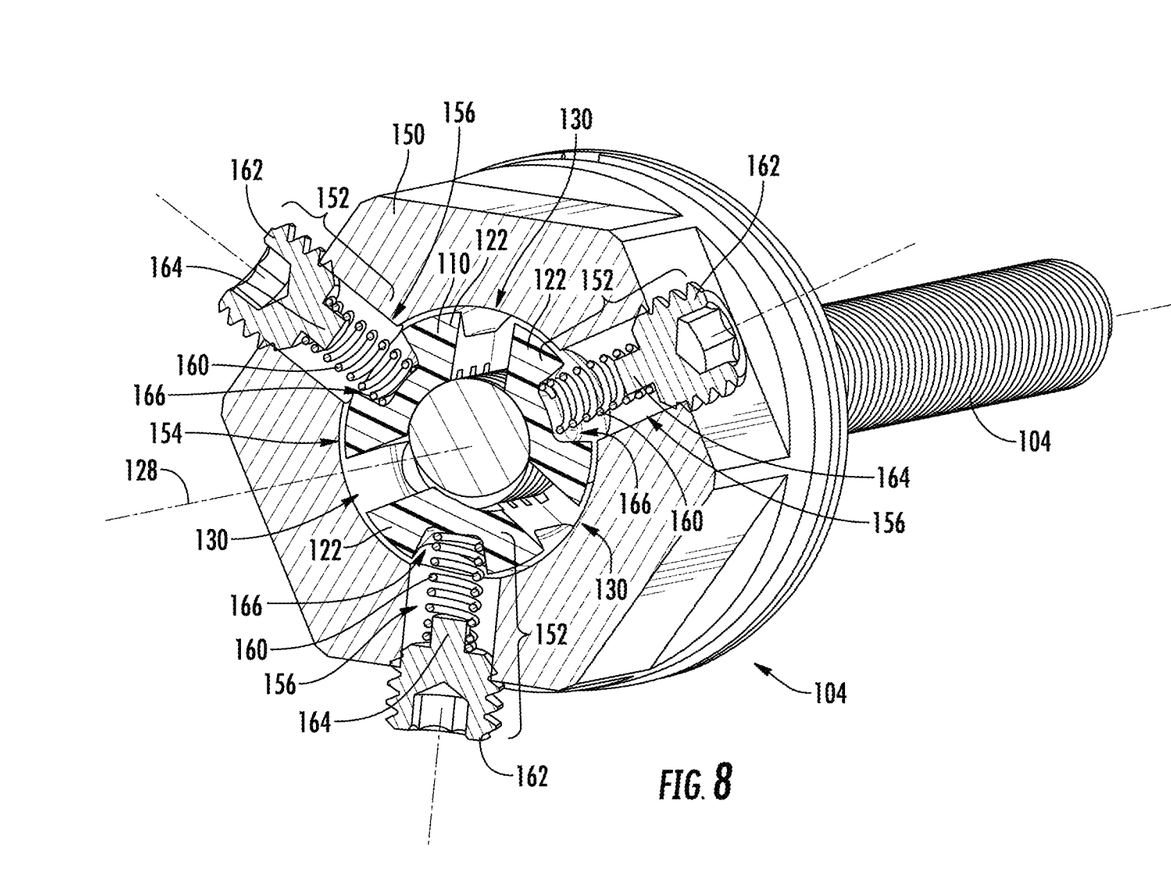
FIG. 8 is a cross-sectional illustration of the nut assembly of FIG. 4 attached to a lead screw.

In an embodiment, and as illustrated in FIG. 7, threading 124 may be associated with (e.g. axially aligned with) both the flexible fingers 122 as well as annular base portion 120. More particularly, the threading 124 can extend axially into the aperture defined by the annular base portion 120. In other embodiments, the threading could be provided solely adjacent the flexible fingers 122.

Further, as illustrated in FIG. 7, threading 122 has two separate sections 134, 136. These two sections of threading are different in that the first section 134 has a decreasing major diameter M1 (defined between lines 138A, 138B which are defined by the root of threading 124) when moving in a first direction 140 along central axis 128 illustrated by arrow 140 in FIG. 7. This first direction 140 is also the direction when moving from free ends 142 of flexible fingers 122 towards annular base portion 120 along central axis 128. While exaggerated in FIG. 7, the angle α1 formed between central axis 128 and each of lines 138A, 138B and central axis 128 is greater than zero degrees and preferably less than one and a half degrees, more preferably less than one degree and more preferably approximately one-half of a degree.

While major diameter M1 of the first section of threading 134 decreases when moving in first direction 140 along the central axis 128, the second section of threading 136 increases in major diameter M2 (defined between lines 146A, 146B which are again defined by the root of threading 124). Again, angle α2 formed between the central axis 128 and each of lines 146A, 146B is greater than zero degrees and preferably less than one and a half degrees, more preferably less than one degree and more preferably approximately one-half of a degree.

Angles α1 and α2 can be different or the same.

In one example, the root portion of the first and second sections of threading 134, 136 provides an hour glass profile.

Further, in some embodiments, when the major diameter of the threading 124 tapers, the thread flanks can change in the radial dimension to be longer in the larger major diameter regions of the threading 124. This is illustrated by the different radial dimension of thread flanks proximate the ends 142 of fingers 122 as compared to the center of the nut 110 (e.g. where lines 138A, 138B intersect lines 146A, 146B).

The threading 124 is supported by the flexible fingers 122 such that flexure of the flexible fingers 122 (e.g. in the radial direction) allows for maintained engagement with a corresponding lead screw. This allows for misalignment compensation in the assembly between the lead screw and the nut member 110. This misalignment is often due to misalignment of the motor 100 relative to the object the motor 100 is moving. This tapered arrangement allows for some misalignment.

Threading 124 is illustrated as being unitarily formed with flexible fingers 122 (i.e. the flexible fingers 122 and threading 124 are formed from a single piece of material). However, threading 124 could be separately formed and then secured to flexible fingers 122. For instance, a cheaper material or material more suited for the desired flexure could be used for flexible fingers 122 while the threading 124 could be formed from a low friction material. The attachment could be by way of welding (e.g. ultrasonic welding), bonding (adhesive or internal bonding), interference fit or otherwise.

The flexible fingers 122 are angularly spaced apart from one another about a central axis 128 with grooves 130 formed between adjacent pairs of the flexible fingers 122. The grooves 130 allow each finger 122 to generally flex radially as well as angularly relative to central axis 128 independent of one another.

The adjustment arrangement 112 biases the flexible fingers 122 radially inward toward central axis 128 so as to adjust the engagement between the flexible fingers 122 and the lead screw 104. In the illustrated embodiment, the adjustment arrangement 112 is able to independently adjust the radially biasing of each of the flexible fingers 122.

With reference to FIGS. 4-6 and 8, the adjustment arrangement 112 generally includes a cap member 150 and a plurality of adjustment members 152. The adjustment members 152 are the same and operate the same, such that only a single adjustment member 152 need be described.

The cap member 150 defines an internal cavity 154 the received at the flexible fingers 122 of the nut member 110 therein. A plurality of through bores 156 extend through the sidewall of the cap member 150. The adjustment members 152 are movably mounted within through bores 156 such that the adjustment members 152 can move radially relative to the central axis 128 to adjust the biasing applied to corresponding ones of the flexible fingers 122.

In the illustrated embodiment, each adjustment member 152 includes a spring 160 and a screw 162. The spring 160 is positioned radially between the screw 162 and a corresponding outer periphery of a flexible finger 122 of nut member 110. Adjusting the radial position of screw 162 adjusts the compression of spring 160 and the biasing force applied by the adjustment member 152 to the corresponding flexible finger 122.

Increased biasing occurs by threading the screw 162 radially inward and decreased biasing occurs by threading the screw 162 radially outward.

The independent adjustability of each screw 162 is different than prior designs that used a ring that would extend entirely around the nut and engage the outer periphery of all of the finger simultaneously. Thus, in prior designs, the biasing of each finger 122 and the corresponding engagement between that finger 122 and the lead screw 102 could not be independently adjusted.

Here, the adjustment members 152 do not form a ring that extends entirely around the nut 110 or the central axis 128.

The springs 160 can be configured to be identical or to have different biasing profiles. For example, the lengths of the springs 160 could be varied or the spring constants of the springs 160 could be varied. This allows for the biasing profile for each finger 122 to be adjusted.

In the illustrated example, screws 162 include a locating pin 164 that extends into corresponding spring 160 to properly orient spring 160.

While not required, the outer periphery of the each flexible finger 122 includes an alignment cavity 166 that receives the corresponding adjustment member 152 and more particularly an end of a corresponding spring 160.

The adjustment members 152 can help prevent rotation of the nut member 110 relative the cap member 150 about axis 128. The inclusion of alignment cavities 166 and axial receipt of the adjustment member therein further inhibits the relative movement between the cap member 150 and nut member 110. During assembly, one or more of screws 162 may be over tightened to compress spring 160 into alignment cavity 166 to help prevent rotation. Alternatively, during assembly, the spring 160 could be removed/omitted and the screw 162 could extend into cavity 166 and through bores 156 to inhibit rotation.

In this embodiment, there is an adjustment member 152 associated with each flexible finger 122 such that the biasing applied to each flexible finger 122 can be independently adjusted.

In this example, each adjustment member 152 is positioned at a same axial location along central axis 128 and similarly applies its biasing force at a same distance from annular base portion 120.

In some examples, the biasing, when adjusted, is applied at substantially a same axial location along the flexible fingers 122. In other words, the biasing member 152 need not move axially along the finger(s) 122 to adjust the biasing provided thereby.

While three fingers 122 are illustrated, other numbers of fingers 122 could be employed. Preferably, the fingers 122 are equally angularly spaced about central axis 128.

The flexible fingers 122 and cooperating adjustment members 152 again allow for further compensation of misalignment between the nut member 110 and the lead screw 102. Further, the adjustment members 152 allow for adjustment due to wear of the nut member 110 and/or threading 124.

Further yet, the adjustment members 152 allow for adjustment to the braking and breakaway force provided between the nut member 110 and the lead screw 102. This can be useful when the linear actuator has the lead screw 102 in a vertical orientation such that gravity is constantly acting on the system. If insufficient breakaway torque is present, the nut member 110 and lead screw 102 can move relative to one another simply under the loading provided by gravity. The current adjustment members 152 allow for very precise adjustments in these forces.

With reference to FIGS. 5 and 6, to axially secure the nut member 110, the nut member 110 includes a first abutment 170 that axially abuts abutment 172 of the nut adaptor 114. The nut member 110 includes a second abutment 174 that axially abuts abutment 176 of the cap member 150.

In this example, the abutments 170, 172, 174, 176 are generally flat relative to one another and configured to prevent pivoting motion of the annular base portion 120 relative to the cap member 150 and nut adaptor 114.

The nut adaptor 114 and cap member 150 have cooperating threading 178, 180 to secure the components to one another and to axially secure the nut member 110 therebetween.

Figure 9:
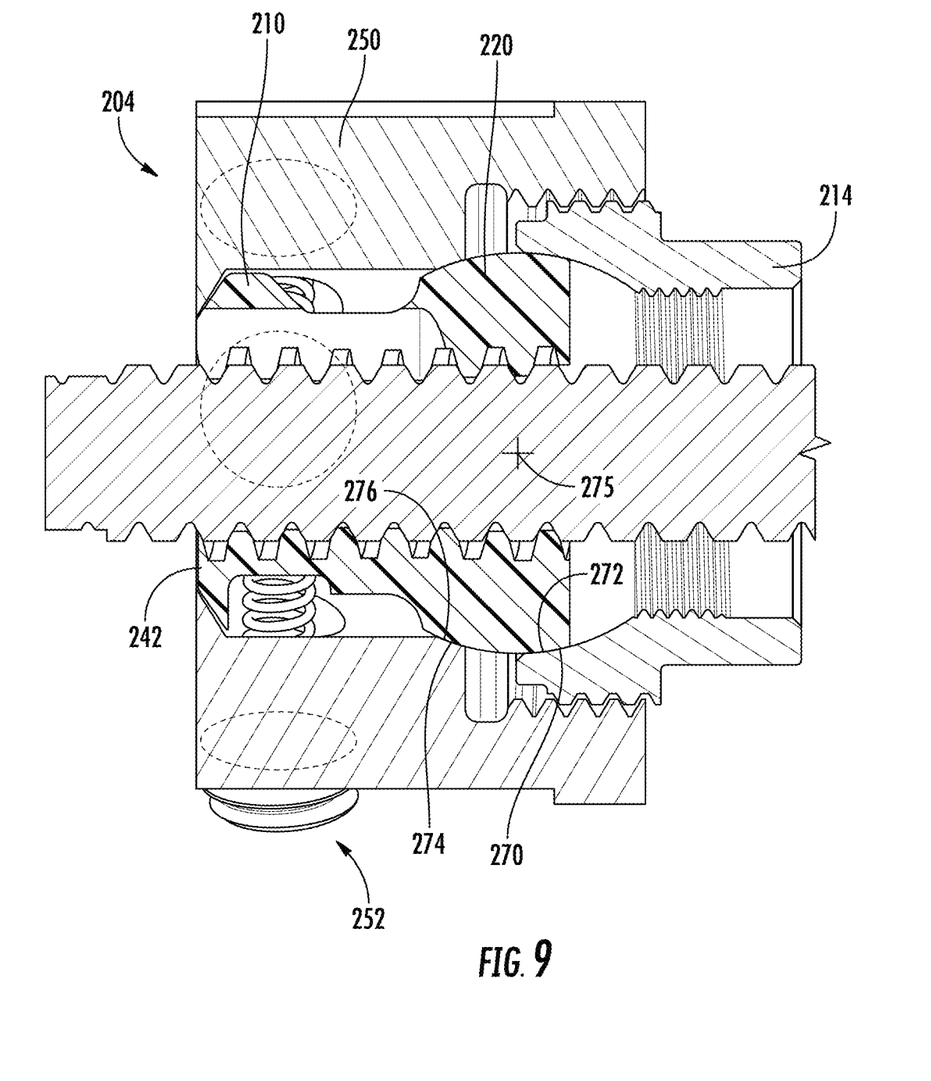
FIG. 9 is a cross-sectional illustration of a further nut assembly for use in the linear actuator of FIG. 1.

FIG. 9 illustrates a further example of a nut assembly 204. The nut assembly 204 includes a nut member 210, an adjustment arrangement 212, and a nut adaptor 214.

The nut member 210 includes flexible fingers 222 that cooperate with the adjustment arrangement 212 and adjustment members 252 in substantially the same way as described above. As such, those components will not be described again.

The main difference between this example and the prior example is the mounting of the nut member 210 to the cap member 250 and the nut adaptor 214.

In this embodiment, the annular base portion 220 has an outer periphery that is formed from a partial sphere. As such, the first abutment 270 and third abutment 274 form part of a same sphere having a same spherical center point 275.

The second abutment 272 and fourth abutment 276 have an arcuate shape as well. Typically, the arcuate shape of the second abutment 272 and fourth abutment 276 will be similar to or substantially equal to the partial sphere of which the first and third abutments 270, 274 form a part. At a minimum, the second abutment 272 and fourth abutment 276 are designed to allow the annular base portion 220 to pivot about spherical center point 275. As such, the second abutment 272 and fourth abutment 276 are designed to allow sliding contact with corresponding first abutment 270 and third abutment 274.

The ability for the nut member 210 to pivot about spherical center point 275 due to this arrangement provides another way to compensate for misalignment between the lead screw and the nut assembly 204.

As the nut assemblies 104, 204 are designed to allow for slight misalignment between the nut member 110, 210 and a lead screw, a clearance is provided between the free ends 142, 242 and the inner periphery of the cap members 150, 250.

With reference to FIG. 6, the inner periphery of the cap member 150 has a tapered surface 190 proximate free end 142 of the flexible fingers 122. Further, the free end 142 includes a tapered surface 192. Without any deflection, the tapered surface 190 is closer to being perpendicular to central axis 128 than tapered surface 192.

Also, when the cap member 150 and flexible fingers 122 are perfectly centered, a clearance 194 is provided between the two components. Due to the different angled orientations of these surfaces 190, 192, clearance 194 has a wedge shaped profile. However, other arrangements need not have this difference in angles for surfaces 190, 192.

The clearance 194 permits the free ends 142 of the flexible fingers 122 to flex radially outward when load is applied by the threads 126 of the lead screw. However, surface 190 of the cap member 150 limits the amount of outward flexure.

The various features alone or in combination can assist in allowing the nut member to flex and/or move within the cap member to allow for limited self-aligning of the nut member relative to a lead screw.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A nut assembly for engaging external threads a lead screw comprising:
    a nut member including:
        an annular base portion; and
        at least a first flexible finger and a second flexible finger joined to the base portion, each of the first flexible finger and the second flexible finger extending axially from the base portion, each of the first flexible finger and the second flexible finger extending between a first end joined to the base portion and a second free end; and
        threading on an inner periphery of the first and second flexible fingers for engaging with the external threads of a lead screw;
    an adjustment arrangement including:
        a cap member extending around the first and second flexible fingers;
        a first adjustment member movably mounted to the cap member to move radially relative to the central axis, the first adjustment member biasing the first flexible finger radially towards the central axis; and
        a second adjustment member movably mounted to the cap member to move radially relative to the central axis, the second adjustment member biasing the second flexible finger radially towards the central axis, the radial positioning of the second adjustment member being independently adjustable from the radial positioning of the first adjustment member.

2. The nut assembly of claim 1, wherein:
    the first adjustment member includes a first screw threadedly mounted to the cap member, the first screw being radially movable relative to the central axis by threading the first screw relative to the cap member to adjust the biasing of the first adjustment member on the first flexible finger; and
    the second adjustment member includes a second screw threadedly mounted to the cap member, the second screw being radially movable relative to the central axis by threading the second screw relative to the cap member to adjust the biasing of the second adjustment member on the second flexible finger;
    the adjustment of the positioning of the first screw relative to the cap member being independent of the adjustment of the positioning of the second screw relative to the cap member.

3. The nut assembly of claim 2, wherein:
    the first adjustment member includes a first spring position radially between the first screw and the first flexible finger; and
    the second adjustment member includes a second spring positioned radially between the second screw and the second flexible finger.

4. The nut assembly of claim 1, further comprising a nut adaptor having external threading that engages internal threading of the cap member to threadedly attach the cap member to the nut adaptor, the nut adaptor having a first abutment portion axially abutting a third abutment portion of the base portion;
    wherein the cap member includes a second abutment portion axially abutting a fourth abutment portion of the nut member; and
    wherein the nut member is axially located between the first and second abutment portions.

5. The nut assembly of claim 4, wherein:
    the first abutment portion has a curved profile and the third abutment portion of the base portion has a curved profile that engages the curved profile of the first abutment portion; and
    the second abutment portion has a curved profile and the fourth abutment portion has a curved profile that engages the curved profile of the second abutment portion.

6. The nut assembly of claim 5, wherein the second and fourth abutment portions have a same center of curvature such that the second and fourth abutment portions form part of a common theoretical sphere.

7. The nut assembly of claim 5, wherein the third abutment portion is slidable relative to the first abutment portion and the fourth abutment portion is slidable relative to the second abutment portion such that the nut member is pivotable within the cap member.

8. The nut assembly of claim 5, wherein the fourth abutment portion is provided by the base portion.

9. The nut assembly of claim 3, wherein:
    the first flexible finger has a receiving cavity receiving a first end of the first spring therein and the first screw has a first projection, the first spring having a second end receiving the first projection therein; and
    the second flexible finger has a receiving cavity receiving a first end of the second spring therein and the second screw has a second projection, the second spring having a second end receiving the second projection therein.

10. The nut assembly of claim 4, wherein an outer periphery of the cap member has a plurality of flats such that it is engageable by a wrench.

11. The nut assembly of claim 10, wherein the first and second adjust members extend through the flats.

12. The nut assembly of claim 1, wherein adjustment of the biasing provided by first adjustment member is independent of the adjustment of the biasing provided by the second adjustment member.

13. The nut assembly of claim 4, wherein the first abutment portion, second abutment portion, third abutment portion and fourth abutment portion are all planar.

14. The nut assembly of claim 1, wherein the first adjust member does not extend entirely around the central axis and the second adjust member does not extend entirely around the central axis.

15. The nut assembly of claim 1, wherein the first adjustment member applies biasing to the first flexible finger at a first distance from the base portion and the second adjustment member applies biasing to the second flexible finger at the first distance from the base portion.

16. The nut assembly of claim 1, wherein the first adjustment member applies biasing to the first finger at a same axial location along the central axis as the second adjustment member applies biasing to the second finger.

17. The nut assembly of claim 1, wherein:
    a major diameter of the threading of the nut has a first section and a second section;

the first section decreasing in value when moving a first direction along the central axis, the first direction is towards the second section; and the second section increasing in value when moving in the first direction along the central axis.

18. The nut assembly of claim 17, wherein the threading extends axially within the base portion of the nut member, the first section being aligned with the first and second flexible fingers and at least part of the second section being aligned with the base portion of the nut member.

19. The nut assembly of claim 17, wherein a first taper axis of the first section of the major diameter has an angle of no more than 1 degree relative to the central axis and a second taper axis of the second section of the major diameter has an angle of no more than 1 degree relative to the central axis.

20. A method of adjusting a nut assembly of claim 1 comprising:

adjusting a radial position of the first adjustment member without adjusting a radial position of the second adjust member.

21. A nut assembly for engaging external threads a lead screw comprising:

a nut member including:

an annular base portion having an outer peripheral surface that forms part of a theoretical sphere having a spherical center point;

at least a first flexible finger and a second flexible finger joined to the base portion, each of the first flexible finger and the second flexible finger extending axially from the base portion, each of the first flexible finger and the second flexible finger extending between a first end joined to the base portion and a second free end; and threading on an inner periphery of the first and second flexible fingers for engaging with the external threads of a lead screw;

a cap member extending around the first and second flexible fingers and axially abutting a portion of the annular base portion;

a nut adaptor attached to the cap member and axially abutting a portion of the annular base portion, with the annular base portion being axially fixed between the cap member and the nut adaptor; and the annular base portion being pivotable about the spherical center point within cap member.

22. The nut assembly of claim 21, wherein a portion of the cap member that abuts the annular base portion has a curved surface and a portion of the nut adaptor that abuts the annular base portion has a curved surface.

* * * * *